219-121 SR

4/3/79 OR 4,147,918

United States Patent [19]

Ritter et al.

[11] 4,147,918

[45] Apr. 3, 1979

[54] METHOD OF MAKING KNIVES

[75] Inventors: Rolf Ritter, Geislingen; Hermann Riegert, Treffelhausen, both of, Fed. Rep. of Germany

[73] Assignee: Wurttembergische Metallwarenfabrik, Geislingen, Steige, Fed. Rep. of Germany

[21] Appl. No.: 793,547

[22] Filed: May 4, 1977

Related U.S. Application Data

[63] Continuation of Ser. No. 724,080, Sep. 17, 1976, abandoned.

[30] Foreign Application Priority Data

Sep. 25, 1975 [DE] Fed. Rep. of Germany ....... 2542883

[51] Int. Cl.[2] .............................................. B23K 15/00

[52] U.S. Cl. .............................. 219/121 EM; 30/340; 30/125; 219/101

[58] Field of Search ................. 219/121 EM, 121 EB, 219/101, 105; 30/340, 342, 344, 125, 136; 76/101 R; 7/11

[56] References Cited

U.S. PATENT DOCUMENTS

| | | | |
|---|---|---|---|
| 666,012 | 1/1901 | Hirsch | 30/344 |
| 1,012,088 | 12/1911 | Lee | 30/344 |
| 1,020,158 | 3/1912 | Powers | 30/344 |
| 3,481,038 | 12/1969 | Cooper | 30/344 |
| 3,911,766 | 10/1975 | Fridolph et al. | 76/101 R |
| 3,949,186 | 4/1976 | Nakayama et al. | 219/121 LM |

FOREIGN PATENT DOCUMENTS

| | | | |
|---|---|---|---|
| 2407994 | 8/1975 | Fed. Rep. of Germany | 30/344 |
| 47-724 | 1972 | Japan | 219/121 EB |

OTHER PUBLICATIONS

Why Use Electron Beam Welding?, J. Meier - Hamilton Standard.

*Primary Examiner*—Elliot A. Goldberg
*Assistant Examiner*—M. Paschall
*Attorney, Agent, or Firm*—Finnegan, Henderson, Farabow & Garrett

[57] ABSTRACT

A method of making knives in which a separate blade and handle are bonded together by electron-beam welding which reduces the susceptibility to corrosion at the weld area and thereby increases the knife life. In addition, the blade can be unhardened when welded, and hardened after welding to reverse any structural changes occurring in the metal adjacent the weld and thereby more reliably reduce the susceptibility to corrosion at the weld area. The step of hardening the blade after welding can be used to provide satisfactory corrosion resistance in knives where separate blades and handles are joined by other welding techniques such as electrical seam and oxyacetylene welding.

4 Claims, 6 Drawing Figures

1
2
2a
2b
3
4
5
6
III

METHOD OF MAKING KNIVES

This application is a continuation of our application Ser. No. 724,080 now abandoned filed Sept. 17, 1976 for Method of Making Knives.

This invention relates to knives. More particularly, this invention relates to a method of making knives which results in an improved knife construction which is strong and is highly resistant to corrosion.

Prior to this invention, many high-grade knives were constructed of a hardened and ground blade and a separately fabricated hollow handle. The blade is provided with a crop and a tongue extending therefrom, the latter being leaded or cemented into the hollow handle. Several problems arise with this construction including loosening of the bond between the blade and the handle, and corrosion which forms in a gap between the blade and the handle. This latter problem is particularly accentuated by repeated washings of these knives in automatic dishwashers.

Furthermore, blades which have been joined to a hollow handle using a filler lead or cement result in an undesirably heavy knife.

German Pat. No. 1,111,535 relates to an improvement over the aforementioned method and resulting construction in that is discloses a knife having a blade formed with a crop and tongue and joined to a hollow handle by electrical seam welding at the impact site of the rim of the handle and the lower side of the crop. However, even though the resulting construction in an improvement in that it results in a stronger knife which is lighter in weight, it still suffers from the problem of undesirable corrosion occurring adjacent the weld seam.

Thus, electrical seam welding utilizes temperatures in the vicinity of 700 - 800° C. and alters the crystalline structure of the metal adjacent the weld seam. Specifically, electrical seam welding forms reticular carbides in the metal adjacent the weld seam. It is believed that this formation results in a highly corrosion-susceptible structure which, as described above, is promoted even further, by the commonplace usage of dishwashers.

In accordance with the present invention, an improved method of forming a knife utilizes a simple step of welding separately formed, metal knife blades and handles without corrosion-susceptibility arising in the welding region. This is achieved by the utilization of electron-beam welding to join the knife blade and handle. Even though the temperature is raised to 3,000° in electron-beam welding, the knives fabricated according to the invention are surprisingly free from corrosion at the welding seam. This might be due to the fact that the temperatures in electron-beam welding are short lived so that no undesirable crystalline structural changes take place adjacent the weld.

The method of this invention may further be significantly improved by welding an unhardened blade to a handle, and then heat treating the blade after welding. This produces the desired hardness in the blade and serves to reverse any crystalline structural changes occurring near the weld thereby correspondingly reducing the susceptibility to corrosion at this area even further.

In addition, the step of hardening the blade after welding to the handle can be used to obtain satisfactory results in reversing crystalline structural changes such as occur in electrical or oxyacetylene welding so that susceptibility to corrosion is kept within tolerable limits in knives formed using these welding techniques. Thus, even though electron-beam welding produces optimum results in the present invention, satisfactory results are achieved using other welding techniques, e.g., electrical or oxyacetylene welding, to join a handle to an unhardened blade, followed by the step of heat treating the blade.

Accordingly, it is a primary object in this invention to provide a new and improved method for making knives.

A still further object of this invention is to provide a new and improved method of making knives in which the resulting product is strong, lightweight, and highly resistant to corrosion.

Still another object of this invention is to provide a new and improved method of making knives in which a separately formed knife blade is joined to a separate handle by electronbeam welding so that corrosion susceptibility at the weld area is greatly reduced or eliminated. The method of this invention can be further improved if the blade is unhardened when welded to the handle and is hardened after the welding process to reverse any crystalline structural changes occurring at the weld area, so that corrosion susceptibility at the weld area is reduced even further. This process step of hardening after welding can be used when joining blades and handles using other welding techniques such as electrical seam welding, oxyacetylene welding, and inert gas welding, although optimum results are achieved when using electron-beam welding. The electron-beam welding process concentrates the high temperature at the weld seam itself and for only a short time and results in little or no structural changes in the material adjacent the weld area.

A still further object of the present invention is to provide a new and improved method of making knives utilizing the steps of joining a separate knife blade and hollow handle by welding, and thereafter hardening the knife blade to reverse structural changes in the metal adjacent the weld area, and wherein the handle may include an aperture to allow expanding air therein to escape when heating during hardening. Otherwise, this heated and expanding air could cause the handle to warp. Alternatively, the air within the handle may be partially evacuated prior to welding so that expansion of any remaining air may occur without warping.

Still another object of the present invention is to provide a new and improved method of making knives which can include a separately formed blade and a pair of clam shell handle members, wherein the handle members and blade may be clamped together and welded in a single operation.

Additional objects and advantages of the invention will be set forth in part in the description which follows and in part will be obvious from the description, or may be learned by practice of the invention. The objects and advantages of the invention may be realized and attained by the instrumentalities and combinations particularly pointed out in the appended claims.

To achieve the foregoing objects and in accordance with the purpose of the invention, as embodied and broadly described herein, the method of this invention comprises providing a separate knife blade and handle, and joining the knife blade and handle by electron-beam welding. As a further aspect of the invention, the knife blade may be hardened after welding to thereby reverse crystalline structural changes occurring in the metal adjacent the weld area and thereby reduce the susceptibility of the knife to corrosion at this area. The step of hardening the blade after welding may be used to reverse crystalline structural changes in knife blades and handles joined by electrical seam welding, oxyacetylene welding, and inert gas welding, but optimum results are achieved using knife blades and handles joined by electron-beam welding.

Furthermore, in the event a hollow handle made up of a pair of clam shell members is used, the clam shell members and the blade can be clamped and welded in a single operation. In any event, when a hollow handle is employed, it may have a preformed aperture to allow expanding air within the handle to escape during heating to prevent handle warpage. Alternatively, air within the hollow handle may be partially evacuated before welding so that the remaining air can expand freely without causing warpage.

The accompanying drawings, which are incorporated in and constitute a part of this specification, illustrate embodiments of the invention and, together with the description, serve to explain the principles of the invention.

OF THE DRAWINGS

Reference will now be made in detail to the present invention, preferred embodiments of which are illustrated in the accompanying drawings.

Figures 1, 2, 3:
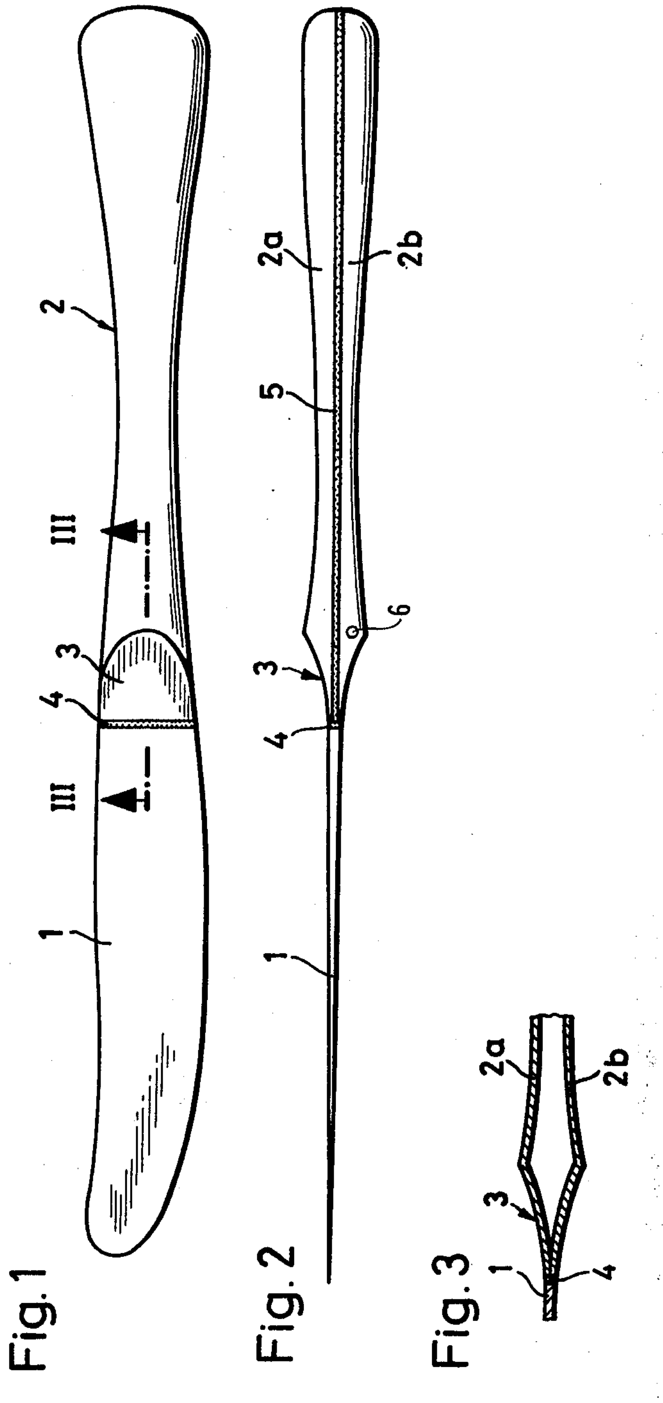
FIG. 1 is a plan view of a knife formed in accordance with a preferred form of the present invention.
FIG. 2 is a top plan view of FIG. 1.
FIG. 3 is a sectional view taken along line 3—3 of FIG. 1.

Referring now to FIGS. 1-3, it may be seen that a knife made in accordance with the principles of the present invention includes a flat, hardened blade (1) having a handle (2) constructed of clam shell portions (*2a*), (*2b*), all of which may be constructed of a suitable material such as stainless steel. The handle 2 includes a crop (3) shaped to form a smooth transition with the abutting portion of the blade (1).

In accordance with the invention, the blade (1) and the handle (2) are abutted and joined by electron-beam welding along a weld seam (4). In addition, handle portions (*2a*), (*2b*) can also be joined by welding, a portion of this weld seam being shown at (5) in FIG. 2. Desirably, the blade (1) and the handle portions (*2a*) and (*2b*) can be welded in a single operation utilizing a single clamping device.

Knife blades are necessarily hardened and ground to facilitate the desired cutting action. Furthermore, knife blades are customarily prehardened and ground so that after joining to the handle, the knife is finished and ready for use. However, in accordance with another feature of the present invention, the blade hardening process can be performed after welding the handle and an unhardened blade. This reverses any structural changes caused by welding and even more reliably reduces the susceptibility of the welded metal to corrosion.

Thus, in accordance with the invention, handle (2) [either formed as a single piece or as the two clam shell portions (*2a*), (*2b*)] is placed in a suitable clamp fixture together with the blade (1) so that the blade (1) and handle (2) abut at the terminus of the crop (3). Thereafter the blade (1) and the handle (2) are joined together by electron-beam welding along seam (4) substantially as shown.

If the blade (1) is as yet unhardened, the blade (1) is then hardened by heating it to the appropriate temperature followed by cooling either by quenching, air cooling, or cooling in an inert gas environment. If a hollow-handle utilizing separate clam shell segments (*2a*), (2b) is used, these segments are clamped in the same fixture with the blade (1) and are welded along the seam (5) in the same operation as the weld seam 4.

In accordance with the present invention, it has been discovered that by joining a separate knife blade and handle by electron-beam welding, the resulting knives are surprisingly free from corrosion in the vicinity of the welding seam, even after frequent dishwasher cleanings using corresponding additives. This may be be because the heating by electron-beam welding is short-lived so that little or no undesired crystalline structural changes occur in the vicinity of the weld seam.

According to another feature of the present invention it has been discovered that if the welded knife is heat treated after the welding process has been performed, any crystalline structural changes (formation of reticular carbides) occurring in the vicinity of the weld seam are reversed so that the susceptibility to corrosion during use is eliminated even more reliably. In either case, knives made by the present inventive process exhibit a greatly improved life over those formed using a lead or adhesive to join the blade and handle, and those formed by joining a pre-hardened blade to a handle by electrical seam welding, or oxyacetylene welding.

It will be appreciated that in those cases where the knife blade is joined to a hollow handle, air in that handle is heated during welding and later heat treating. If trapped in the handle, this heated air expands and can cause the handle to warp. To overcome this, air within the handle (2) can be partially evacuated before the welding process is carried out. Alternatively, a small aperture (6) in the handle (2) allows the heated expanding air to escape. If desired, the aperture (6) is suitably closed after the welding and heat treating processes. In either case, the warping problem is obviated.

Figure 4:
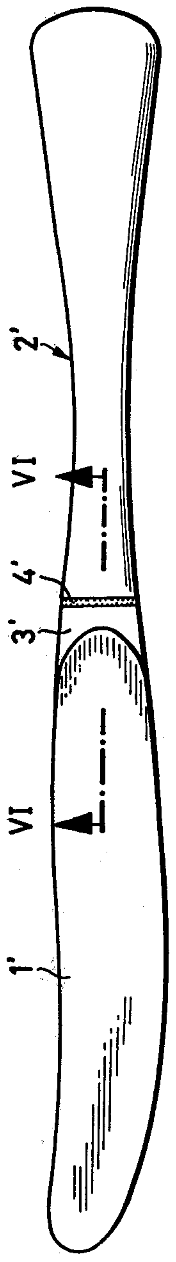
FIG. 4 is a view similar to FIG. 1 showing a modified form of the invention.
Figure 5:
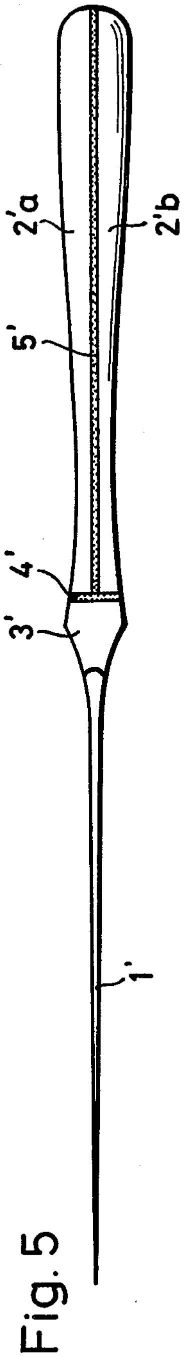
FIG. 5 is a top plan view of FIG. 4.
Figure 6:
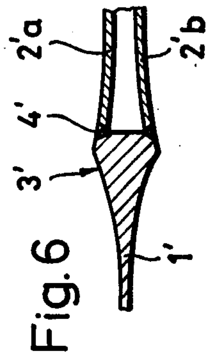
FIG. 6 is a sectional view of FIG. 4 taken along the line 6—6 thereof.

A modified form of the invention is shown in FIGS. 4-6 and is seen to include a blade (1′) joined to a handle (2′) along a weld seam (4′). As was the case in the embodiment of FIGS. 1-3, the handle (2′) includes clam shell portions (2′a) and (2′b) joined along a weld seam (5′). The difference between the embodiment of FIGS. 1-3 and the embodiment of FIGS. 4-6 is that in the latter, the transition section and crop (3′) is formed on the blade (1′) rather than the handle. In all other respects, the embodiments are essentially the same.

The invention herein provides a method for making knives that may be carried out efficiently and effectively and which results in an assembled knife which is light in weight, and possesses superior strength and is highly resistant to corrosion in use.

It will be apparent to those skilled in the art that various additions, substitutions, modifications and omissions may be made to the invention as described herein without departing from the scope or spirit of that invention.

We claim:

1. The method of making knives in which an unhardened knife blade and a hollow knife handle are joined together by welding, comprising the steps of joining the unhardened blade with the hollow handle by electron-beam welding while simultaneously creating a vacuum in the handle to remove air therefrom, and hardening the knife blade after welding has taken place.

2. The method of making knives according to claim 1, in which said handle is constructed of two half shells, and wherein said half shells are joined to each other and to said blade by electron-beam welding in one welding operation.

3. The method of making knives according to claim 1 wherein said knife blade and handle are made of stainless steel.

4. The method of making knives according to claim 1 wherein said vacuum in said handle is a partial vacuum, any air remaining within said handle being allowed to expand during said welding and said heat treating steps without warping said handle.

* * * * *